S. P. BILYEU.
AUTOMATIC LUBRICATOR.
APPLICATION FILED SEPT. 18, 1914.
1,230,371.
Patented June 19, 1917.
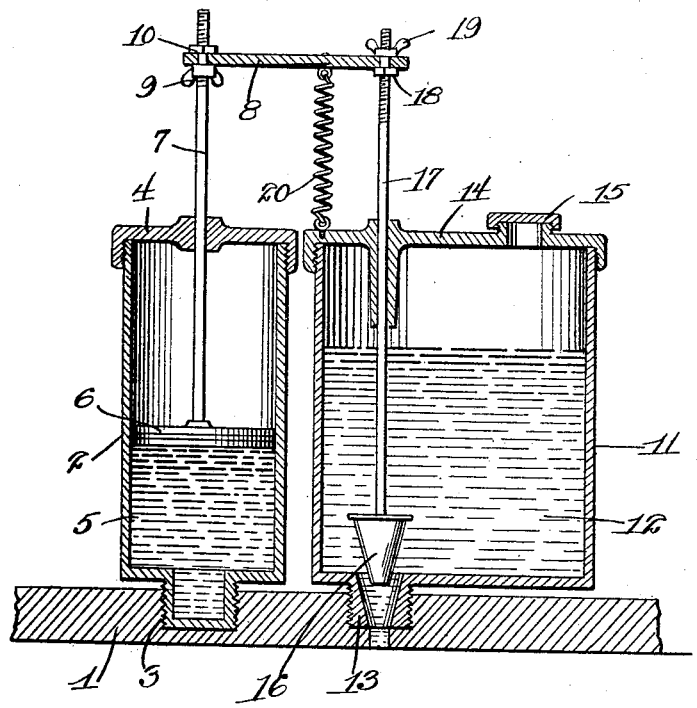
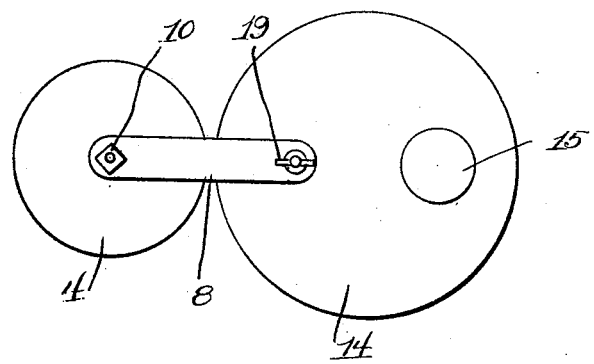

UNITED STATES PATENT OFFICE.

SIMON PETER BILYEU, OF SACRAMENTO, CALIFORNIA.

AUTOMATIC LUBRICATOR.

1,230,371.  Specification of Letters Patent.  Patented June 19, 1917.

Application filed September 18, 1914. Serial No. 862,397.

*To all whom it may concern:*

Be it known that I, SIMON PETER BILYEU, a citizen of the United States, residing at Sacramento, in the county of Sacramento and State of California, have invented certain new and useful Improvements in Automatic Lubricators, of which the following is a specification.

My invention consists in new and useful improvements in a lubricator and more particularly to an automatic lubricator.

The object of the invention is the provision of a lubricator which will be automatically operated upon the increase or decrease of heat in a bearing.

With these and other objects in view the invention consists in the novel details of construction and arrangement of parts which will be more clearly understood from the following description and drawings, in which, Figure 1 is a vertical section, and Fig. 2 is a top plan.

In the drawings, the numeral 1 indicates a section of a journal or bearing of any ordinary construction. The lubricator comprises a small cylinder 2 having a threaded extension 3 which is adapted to be screwed into the journal or bearing and a cap 4 threaded on the top thereof. The bottom of the extension 3 is closed and mercury, indicated at 5, is received within the cylinder 2 and also enters the extension 3. A piston 6 within the cylinder contacts with the mercury and said mercury is held beneath the piston. A piston rod 7 passes through the screw cap 4 and upon this rod is received a bar 8 the purpose of which will be presently described. A thumb nut 9 is threaded on the piston rod for adjusting the position of the bar 8 and a nut 10 locks the bar in its adjusted position.

Adjacent to the cylinder 2 is a larger cylinder 11 adapted to contain the lubricant, indicated at 12. This cylinder 11 is provided with the open ended threaded extension 13 which is threaded into the journal or bearing. The cap 14 is threaded on the top of the cylinder 11 and is provided with the removable cap 15 covering an opening through which the lubricant is introduced into the cylinder. The extension 13 forms a valve seat adapted to receive the conical valve 16 to which is secured a stem 17 which passes through the cap 14 and receives the opposite end of the bar 8. The nut 18 and thumb nut 19 are threaded on the stem 17 for adjusting the position of the bar thereon. A coil spring 20 is secured to the bar 8 and to the cap 14 on the large cylinder.

When the parts are in the position shown in Fig. 1, the lubricant is being fed to the bearing and the valve is preferably held in such a position that a small amount of oil is always being fed into the bearing. Should the bearing become overheated the mercury will expand in the cylinder 2, raise the piston 6 and rod 7 and through means of the bar 8 raise the valve 16 and allow a greater amount of lubricant to pass to the bearing. When the bearing becomes cool the mercury will contract and the piston and valve will be forced downward by means of the spring 20.

Having fully described my invention what I claim as new and desire to secure by Letters Patent is:—

1. A lubricator comprising a mercury cylinder, a closed extension on said cylinder, a piston within the cylinder, an oil cylinder having an open extension, a valve for closing said extension, a bar connecting the piston and valve, and a spring secured to the bar and oil cylinder.

2. A lubricator comprising a mercury cylinder having a closed extension, a piston within the cylinder, a rod connected to the piston and extending beyond the top thereof, an oil cylinder having an open extension, a valve for closing said extension, a rod secured to said valve and extending beyond the top of the cylinder, a bar adjustably secured to the valve rod and piston rod, and a spring secured to the bar and oil cylinder.

In testimony whereof I affix my signature in presence of two witnesses.

SIMON PETER BILYEU.

Witnesses:
 F. W. BENEDIX,
 E. H. TRAYLER.